US010068705B2

(12) United States Patent
Osada et al.

(10) Patent No.: US 10,068,705 B2
(45) Date of Patent: Sep. 4, 2018

(54) METHOD FOR MANUFACTURING CERAMIC ELECTRONIC COMPONENT

(71) Applicant: MURATA MANUFACTURING CO., LTD., Kyoto-fu (JP)

(72) Inventors: Takanori Osada, Nagaokakyo (JP); Atsushi Takahashi, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 217 days.

(21) Appl. No.: 15/271,440

(22) Filed: Sep. 21, 2016

(65) Prior Publication Data
US 2017/0011849 A1 Jan. 12, 2017

Related U.S. Application Data

(63) Continuation of application No. PCT/JP2015/058157, filed on Mar. 19, 2015.

(30) Foreign Application Priority Data

Mar. 26, 2014 (JP) .................... 2014-063168

(51) Int. Cl.
*C25D 3/12* (2006.01)
*C25D 3/38* (2006.01)
(Continued)

(52) U.S. Cl.
CPC ............... *H01F 41/10* (2013.01); *C25D 5/34* (2013.01); *C25D 5/54* (2013.01); *C25D 21/12* (2013.01);
(Continued)

(58) Field of Classification Search
CPC .................... C25D 21/12; C25D 5/54
(Continued)

(56) References Cited

U.S. PATENT DOCUMENTS

2009/0310278 A1 12/2009 Tani
2011/0309718 A1 12/2011 Ogawa et al.

FOREIGN PATENT DOCUMENTS

JP S63-086893 A 4/1988
JP H07-090675 A 4/1995
(Continued)

OTHER PUBLICATIONS

International Search Report issued in PCT/JP2015/058157; dated Jun. 2, 2015.
Written Opinion issued in PCT/JP2015/058157; dated Jun. 2, 2015.

Primary Examiner — Brian W Cohen
(74) Attorney, Agent, or Firm — Studebaker & Brackett PC

(57) ABSTRACT

The variation between different product lots is reduced for plating growth dimensions of plated films to serve as external electrodes. The correlation is grasped in advance among the surface resistance value of a ceramic body, the applying charge amount for electrolytic plating, an actual plating growth dimension obtained when the ceramic body with the surface resistance value is subjected to plating with the foregoing applying charge amount. The surface resistance value is measured for the ceramic body on which plated films to serve as external electrodes are to be formed by applying electrolytic plating, and the applying charge amount required for plating is determined by applying the surface resistance value and a designed value for an intended plating growth dimension to the correlation mentioned above. Thereafter, in order to form the plated films, the ceramic body is subjected to electrolytic plating, with the applying charge amount determined.

7 Claims, 3 Drawing Sheets

(51) Int. Cl.
*C25D 5/54* (2006.01)
*C25D 21/12* (2006.01)
*H01F 41/10* (2006.01)
*H01G 4/30* (2006.01)
*H01F 27/29* (2006.01)
*H01G 4/232* (2006.01)
*C25D 5/34* (2006.01)
*H01F 27/24* (2006.01)
*H01F 27/28* (2006.01)
*H01G 4/12* (2006.01)

(52) U.S. Cl.
CPC .............. *H01F 27/24* (2013.01); *H01F 27/28* (2013.01); *H01F 27/29* (2013.01); *H01F 27/292* (2013.01); *H01G 4/2325* (2013.01); *H01G 4/30* (2013.01); *H01G 4/12* (2013.01)

(58) Field of Classification Search
USPC ........................................................ 205/162
See application file for complete search history.

(56) References Cited

FOREIGN PATENT DOCUMENTS

| | | |
|---|---|---|
| JP | H11-067554 A | 3/1999 |
| JP | 2002-249900 A | 9/2002 |
| JP | 2004-100011 A | 4/2004 |
| JP | 2007-204822 A | 8/2007 |
| JP | 2010-021523 A | 1/2010 |
| JP | 2012-004330 A | 1/2012 |

METHOD FOR MANUFACTURING CERAMIC ELECTRONIC COMPONENT

CROSS REFERENCE TO RELATED APPLICATIONS

This application claims benefit of priority to Japanese Patent Application 2014-063168 filed Mar. 26, 2014, and to International Patent Application No. PCT/JP2015/058157 filed Mar. 19, 2015, the entire content of which is incorporated herein by reference.

TECHNICAL FIELD

This disclosure relates to a method for manufacturing a ceramic electronic component, and more particularly, relates to a method for manufacturing a ceramic electronic component, which includes a step of forming at least a part of an external electrode by electrolytic plating.

BACKGROUND

FIG. 5 shows, in a perspective view, the appearance of a ceramic electronic component 1 of interest to this disclosure. The ceramic electronic component 1 includes a chip-shaped ceramic body 2. The ceramic body 2 has a cuboid shape that has a profile defined by four side surfaces 3, 4, 5, and 6 and two end surfaces 7 and 8.

Although not shown, in the ceramic body 2, an internal conductor is provided in a form depending on the function of the ceramic electronic component 1. For example, when the ceramic electronic component 1 is a coil component, a coil conductor is provided in the ceramic body 2, and when the ceramic electronic component 1 is a multilayer ceramic capacitor, multiple sets of internal electrodes opposed to each other are provided therein.

External electrodes 9 and 10 electrically connected to the internal conductor mentioned above are formed on the ceramic body 2. At least parts for each of the external electrodes 9 and 10, that is, surface layers for each of the external electrodes 9 and 10 in the example shown, are provided by plated films 11 and 12 formed by electrolytic plating.

For the formation of the plated films 11 and 12, although not shown, seed electrodes to serve as starting points for plating growth are formed to constitute bases for plated films 13 and 14.

The seed electrodes are, for example, as described in JP 11-67554 A, provided by end-surface base electrodes formed by baking a conductive paste on the end surfaces 7 and 8 of the ceramic body 2, or when the ceramic body 2 has a laminated structure composed of a plurality of ceramic layers, provided by side-surface base electrodes obtained by partially exposing, at side surfaces 3 to 6 electrode layers formed between the ceramic layers.

In the case of the foregoing ceramic electronic component 1, the respective locations of end edges 13 and 14 for each of the plated films 11 and 12 that provide the surface layers of the external electrodes 9 and 10 are determined depending on how the plated films 11 and 12 each undergo plating growth along the side surfaces 3 to 6. More specifically, in the case of the plated film 11 formed on the end surface 7, the location of the end edge 13 is determined depending on how plating grows along the side surfaces 3 to 6 toward the opposed end surface 8. In the case of the plated film 12 formed on the end surface 8, the location of the end edge 14 is determined depending on how plating grows along the side surfaces 3 to 6 toward the opposed end surface 7. To the degree of plating growth along the side surfaces 3 to 6, that is, a plating growth dimension L, the end of the plating growth is important, rather than the beginning of the plating growth.

The factors that determine the plating growth dimension L mentioned above include the charge amount (current value×plating time) applied in electrolytic plating. Therefore, conventionally, the applying charge amount for obtaining an intended plating growth dimension L is set for each product to be manufactured, and electrolytic plating is carried out by applying the set charge amount while the product is manufactured. However, the change in product lot even for the same product may also cause the plating growth dimension L1 to vary between product lots. More specifically, the plating growth dimension L varies between product lots.

The plating growth dimension L preferably varies as little as possible between product lots. This is because the variation in plating growth dimension L may cause the ceramic electronic component 1 to vary in characteristics. For example, when the ceramic electronic component 1 is a coil component, the excessively large plating growth dimension L may increase the degree of interference between the magnetic flux formed by a coil and the plated films 11 and 12, thereby affecting the characteristics of the ceramic electronic component 1. In addition, the variation in plating growth dimension L may cause defective appearances.

Further, methods for controlling the plating growth dimension L include the method described in JP 7-90675 A. JP 7-90675 A mentions a technique of appropriately setting up the pulse current condition for a pulsed power supply with the use of the pulsed power supply for plating an electronic component, thereby making it possible to control a plating growth dimension.

However, the technique mentioned in JP 7-90675 A is not suitable for reducing the variation in plating growth dimension between product lots. According to the technique mentioned in JP 7-90675 A, a pulse control parameter (cutoff value) for an electric current to be supplied is determined on the basis of an intended plating growth dimension, thereby only carrying out plating based on the cutoff value, but the plating growth dimension is not predicted for each product lot, or the correction for obtaining the intended plating growth dimension from the predicted plating growth dimension is not made to the pulse current condition for the pulsed power supply.

SUMMARY

Problem to be Solved by the Disclosure

Therefore, an object of this disclosure is to provide a method for manufacturing a ceramic electronic component, which can reduce, when at least a part of an external electrode is provided by a plated film, the variation in the plating growth dimension of the plated film.

Means for Solving the Problem

This disclosure is directed to a method for manufacturing a ceramic electronic component including a ceramic body and an external electrode formed on the ceramic body, where the external electrode is provided by a plated film formed at least partially by applying electrolytic plating, and in order to solve the technical problems mentioned above, characterized by including the following in a first aspect of the disclosure.

First, a method for manufacturing a ceramic electronic component according to this disclosure includes a pre-grasping step of grasping in advance the correlation among the surface resistance value of a ceramic body, the applying charge amount for electrolytic plating, and an actual plating growth dimension obtained when the ceramic body with the surface resistance value is subjected to plating with the applying charge amount, for a ceramic electronic component to be manufactured.

Further, the method for manufacturing a ceramic electronic component according to this disclosure includes: a resistance value measurement step of measuring the surface resistance value of the ceramic body on which a plated film to serve as at least a part of an external electrode is to be formed by applying electrolytic plating; and an applying charge amount determination step of determining the applying charge amount required for plating by applying the surface resistance value obtained in accordance with the resistance value measurement step and a designed value for an intended plating growth dimension to the above-described correlation.

Thereafter, in order to form the plated film, a plating step is carried out where the ceramic body is subjected to electrolytic plating with the applying charge amount obtained in accordance with the applying charge amount determination step.

In the case of forming the plated film by electrolytic plating, the plating growth dimension is significantly affected by the surface resistance value of the ceramic body. More specifically, there is a tendency for the plating growth dimension to be shorter as the surface resistance value is larger, whereas there is a tendency for the plating growth dimension to be longer as the surface resistance value is smaller. According to this disclosure, as mentioned previously, the correlation is grasped in advance among the surface resistance value of the ceramic body, the applying charge amount, and the plating growth dimension, on that basis, the surface resistance value of the ceramic body on which a plated film is to be formed is measured, and electrolytic plating is applied with the applying charge amount obtained by applying the surface resistance value and the designed value for an intended plating growth dimension to the above-described correlation. Thus, the variation in plating growth dimension can be reduced.

In this disclosure, preferably, the resistance value measurement step is carried out for a specific number of ceramic bodies selected from among a plurality of ceramic bodies in the same product lot, and the average value obtained from the specific number of surface resistance values measured respectively for the specific number of ceramic bodies is regarded as the surface resistance value obtained in accordance with the resistance value measurement step. Further, in the plating step, electrolytic plating is applied to the plurality of ceramic bodies within the same product lot, with the same applying charge amount determined on the basis of the average value obtained from the specific number of surface resistance values as mentioned above.

The preferred embodiment is based on the presumption that the ceramic bodies from the same product lot vary less in surface resistance value, and thus, the reduced variation in plating growth dimension can be ensured even when electrolytic plating is applied with the same applying charge amount determined on the basis of the average value from the specific number of surface resistance values. When this preferred embodiment is adopted, the applying charge amount determination step is required to be carried out only once for the same product lot, and in the plating step, a large number of ceramic bodies can be subjected to electrolytic plating efficiently at the same time, for example, by adopting a barrel plating method.

In this disclosure, according to an embodiment, the ceramic body has a seed electrode formed as a starting point for plating growth, and the plating step is carried out so as to achieve plating growth with the seed electrode as a starting point. Typically, the seed electrode is provided by, for example, a base electrode formed by baking a conductive paste. As described later, when the plating step is carried out more than once, the plated film formed in the previous plating step can serve as a seed electrode in the subsequent plating step.

In this disclosure, the plating step may be carried out more than once. In this case, in each of the plurality of plating steps, the applying charge amount is determined in accordance with the applying charge amount determination step. Further, the correlation grasped in the pre-grasping step and the surface resistance value measured in the resistance value measurement step are used for determining the applying charge amount for each of the plurality of plating steps.

According to the embodiment mentioned above, even when the plating step is carried out more than once, the variation in plating growth dimension can be reduced in each plating step.

The applying charge amount determined in the applying charge amount determination step described above is determined on the basis of the intended plating growth dimension, and thus, normally a target value determination step of determining a designed value for the intended plating growth dimension is further carried out before the applying charge amount determination step.

A method for manufacturing a ceramic electronic component according to this disclosure is, in a second aspect thereof, characterized by including the following.

The method for manufacturing a ceramic electronic component according to this disclosure includes, in the second aspect thereof, a pre-grasping step of preparing a plurality of ceramic bodies that respectively represent different surface resistance values, and using the plurality of ceramic bodies to grasp in advance the correlation among the surface resistance value of the ceramic body, the applying charge amount for electrolytic plating, and an actual plating growth dimension obtained when the ceramic body with the surface resistance value is subjected to plating with the applying charge amount, for a ceramic electronic component to be manufactured.

Further, the method for manufacturing a ceramic electronic component according to this disclosure includes, in a second aspect thereof, a resistance value measurement step of measuring the surface resistance value of a ceramic body on which a plated film to serve as at least a part of an external electrode is to be formed by applying electrolytic plating, other than the plurality of ceramic bodies used in the pre-grasping step, a target value determination step of determining a designed value for an intended plating growth dimension, and an applying charge amount determination step of determining the applying charge amount required for plating by applying the surface resistance value obtained in accordance with the resistance value measurement step, and the designed value for the plating growth dimension, determined in the target value determination step, to the above-described correlation.

Thereafter, as in the case of the first aspect, in order to form the plated film, a plating step is carried out where the ceramic body is subjected to electrolytic plating with the applying charge amount obtained in accordance with the applying charge amount determination step.

In the method for manufacturing a ceramic electronic component according to the second aspect, the plurality of ceramic bodies used in the pre-grasping step and the ceramic body with the surface resistance value measured in the resistance value measurement step are preferably included together in the same product lot.

Advantageous Effect of the Disclosure

According to this disclosure, the variation in plating growth dimension can be reduced for the plated film to serve as at least a part of an external electrode. Therefore, ceramic electronic components manufactured in accordance with this disclosure can reduce variations in characteristics, and reduce the generation of defective appearances.

DETAILED DESCRIPTION

Figure 1:
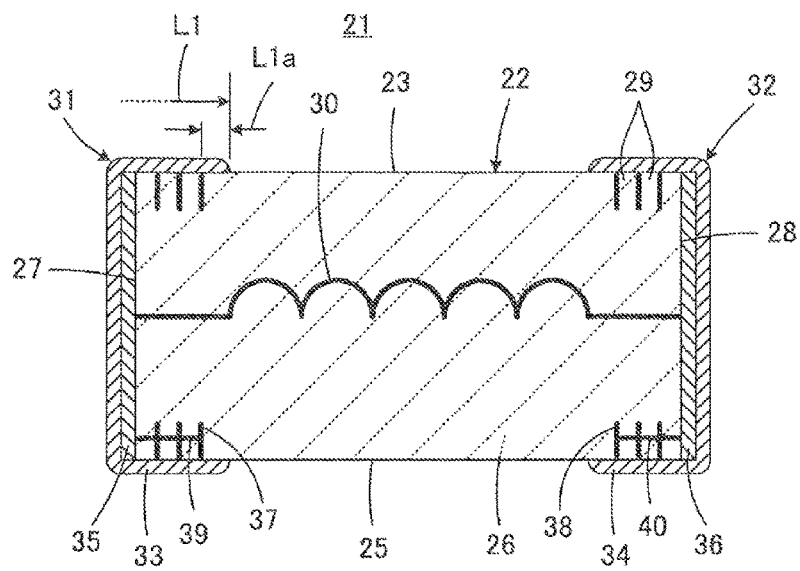
FIG. 1 is a cross-sectional view schematically illustrating a coil component 21 as an example of a ceramic electronic component manufactured by a manufacturing method according to this disclosure.

The structure of a ceramic electronic component manufactured by a manufacturing method according to this disclosure will be described with reference to FIG. 1. FIG. 1 shows a coil component 21 as an example of a ceramic electronic component.

Figure 2:
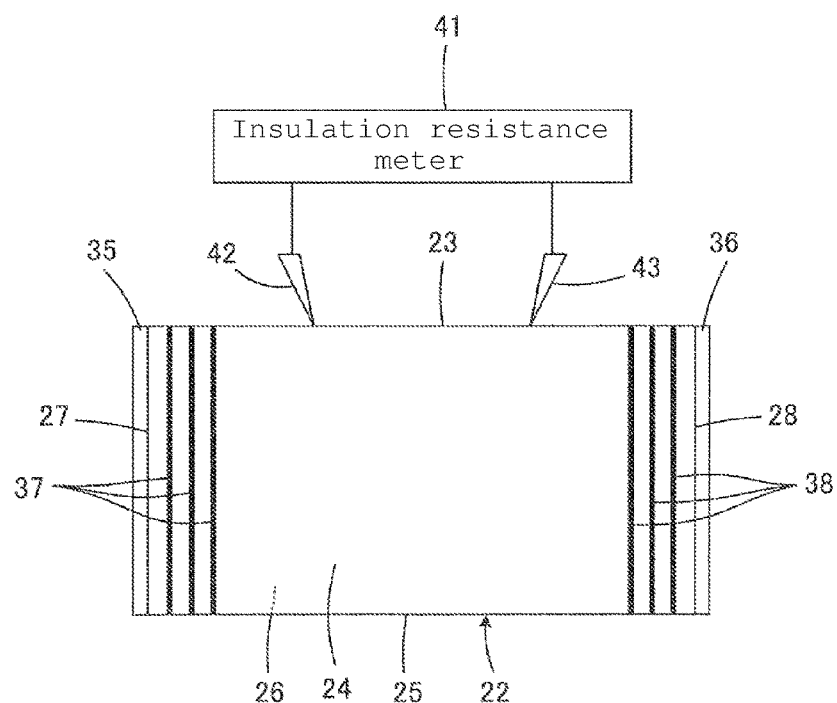
FIG. 2 is a front view for explaining a first embodiment of this disclosure, where a surface resistance value is measured for a ceramic body 22 included in the coil component 21 shown in FIG. 1.

The coil component 21 includes a chip-shaped ceramic body 22 of a magnetic ceramic such as Ni—Zn—Cu-based ferrite, for example. The ceramic body 22 has a cuboid shape that has a profile defined by four side surfaces 23, 24, 25, and 26 (the side surface 24 is shown in FIG. 2, whereas the side surface 26 appears on the backside of the ceramic body 22) and two end surfaces 27 and 28.

The ceramic body 22 has, although not shown in detail, a laminated structure provided by a plurality of ceramic layers 29. The laminating direction of the laminated structure is taken to the horizontal direction in FIG. 1.

In the ceramic body 22, a coil conductor 30 is provided which includes, for example, Ag, Cu, or Pd as a conductive component. It is to be noted that the coil conductor 30 is simplistically illustrated in a symbolic form in FIG. 1. The coil conductor 30 generally extends in a coiled fashion, and actually includes a linear conductor that extends between the ceramic layers 29, and an interlayer connecting conductor that passes through the ceramic layers 29 in the thickness direction while being connected to ends of each line conductor.

External electrodes 31 and 32 are formed on the ceramic body 22. The external electrodes 31 and 32 are respectively provided at least partially by plated films 33 and 34 formed through electrolytic plating. It is to be noted that the coil component 21 shown has the external electrodes 31 and 32 respectively composed of only the plated films 33 and 34. The plated films 33 and 34 are composed of, for example, Ni or Cu. It is to be noted that a case where plated films are composed of a plurality of plated layers will be described later. The ceramic body 22 has seed electrodes formed to serve as starting points for plating growth, in order to form the plated films 33 and 34.

The seed electrodes include end-surface base electrodes 35 and 36 formed on the end surfaces 27 and 28 of the ceramic body 22, as well as respectively a plurality of side-surface base electrodes 37 and 38 formed at the side surfaces 23 to 26 to extend each parallel to the end surfaces 27 and 28.

The end-surface base electrodes 35 and 36 are formed by, for example, applying a conductive paste including Ag or Cu as a conductive component onto the end surfaces 27 and 28, and baking the paste. The end-surface base electrodes 35 and 36 shown are formed respectively over the entire surfaces of the end surfaces 27 and 28, but may be formed, for example, in a mesh or stripe fashion rather than over the entire surfaces.

The side-surface base electrodes 37 and 38 are formed on the ceramic body 22 obtained through a firing step, for example, by applying conductive paste films to serve as side-surface base electrodes 37 and 38, onto specific ones of a plurality of ceramic green sheets to serve as the plurality of ceramic layers 29 which provides the laminated structure of the ceramic body 22. The side-surface base electrodes 37 and 38 shown are formed to go around the four side surfaces 23 to 26.

Preferably, at least one connecting conductor 39 electrically connects the plurality of side-surface base electrodes 37 to each other, and the side-surface base electrodes 37 to the end-surface base electrode 35. Likewise, at least one connecting conductor 40 electrically connects the plurality of side-surface base electrodes 38 to each other, and the side-surface base electrodes 38 to the end-surface base electrode 36. The connecting conductors 39 and 40 act to increase the probability of electrical conduction to the seed electrodes through contacted conductive media, when electrolytic plating is carried out by a barrel plating method as described later. The connecting conductors 39 and 40 are formed by, for example, providing through holes in specific ones of a plurality of ceramic green sheets to serve as the plurality of ceramic layers 29 which provides the laminated structure of the ceramic body 22, and filling the holes with a conductive paste.

For example, a paste containing Ag or Cu as a conductive component is used as the conductive pastes used to form the side-surface base electrodes 37 and 38 and the connecting conductors 39 and 40 as described above.

The plating growth dimensions possessed by the plated films 33 and 34 which provide the external electrodes 31 and 32 as described previously are denoted by "L1" in FIG. 1, and the plating growth dimensions formed toward the centers of the side surfaces 23 and 25 with the side-surface base electrodes 37 and 38 as starting points are denoted by "L1a".

In the formation of the plated films 33 and 34 by electrolytic plating, the change in product lot even for the same product may cause the plating growth dimension L1 to vary for every product lot even with the same applying charge amount as described previously.

It is to be noted that the plating growth dimensions L1 respectively refer to lengths to respective end edges of the plated films 33 and 34 grown toward the centers of the side surfaces 23 to 26, with ends of the end-surface base electrode 35 or 36 as starting points. In addition, the plating growth dimensions Lia refer to lengths to respective end edges of the plated films 33 and 34 grown toward the centers of the side surfaces 23 to 26, with the side-surface base electrodes 37 and located closest to the center of the ceramic body 22 respectively as starting points, among the respectively plurality of side-surface base electrodes 37 and 38.

It has been determined that the cause for the variation in plating growth dimension L1 consists in the variation in the surface resistivity value of the ceramic body 22. More specifically, a larger plating growth dimension is achieved as the surface resistance value is smaller.

The surface resistivity value of the ceramic body 22 varies depending on the material of the ceramic body 22 as a matter of course. For example, when a comparison is made among a thermistor material, a ferrite material, and a dielectric material, the surface resistivity value is increased in this listing order. In addition, for example, even among ferrite materials, the surface resistivity differs depending on the compositions.

In addition, the surface resistivity value of the ceramic body 22 also varies depending on the degree of sintering. Therefore, the surface resistivity value differs between the surface and inside of the ceramic body 22 immediately after being subjected to firing, and thus, also varies depending on whether the ceramic body 22 is subjected to surface polishing or not, or the degree of polishing.

In the experiment made by the inventor, when the ceramic body was subjected to electrolytic plating under the common plating condition of applying a charge amount for 60 minutes at a current value of 12 A, the surface resistance value in the case of a distance of 0.3 mm between measurement terminals was 0.6 TΩ with an achieved plating growth dimension L1a of 22 μm in the case of a sample subjected to no surface polishing, whereas the surface resistance value with the same distance between measurement terminals was 0.3 TΩ with an achieved plating growth dimension L1a of 55 μm in the case of a sample subjected to surface polishing. From the foregoing, it is determined that the surface resistance value of the ceramic body depends on whether surface polishing is carried out or not (or the degree of surface polishing), and the plating growth dimension depends on the surface resistance value.

In order to reduce such a variation in plating growth dimension, the following manufacturing method is employed in this embodiment.

First, before full-scale mass production, the following pre-grasping step is carried out for the coil component 21 to be manufactured.

In the pre-grasping step, first, a step of measuring the surface resistance value of the ceramic body 22 is carried out. In this step, the surface resistance value of the ceramic body 22 is measured by bringing a pair of probes 42 and 43 as measurement terminals in contact with the surface of the ceramic body 22 on a single plane, for example, on the side surface 23 through the use of an insulation resistance meter 41 such as a commercially available high insulation resistance measuring instrument, as shown in FIG. 2. In this case, there is not always a need to obtain the resistivity value of the surface of the ceramic body 22, but it is only necessary to obtain a surface resistance value as a relative value, which is measured while the distance between the pair of probes 42 and 43 is kept constant.

In regard to the measurement of the surface resistance value as described above, in the case of measuring the surface resistivity of an insulator such as a ceramic material, the measurement conducted by a double ring electrode method is common on the basis of the Japanese Industrial Standards "JIS C 2525: Measurement of Surface Resistivity of Ceramic Material". In the double ring electrode method, the test piece shape is determined to be 100 mm in diameter×2 mm in thickness, and the measurement circuit and measurement condition (500 V application×one-minute measurement) are determined. However, in the case of ceramic electronic components to which this disclosure is directed, the dimensions and the shapes differ for each product, and it is thus not efficient to apply the surface resistivity measurement method on the basis of the JIS as mentioned above. In this embodiment, the surface resistance value is obtained efficiently by the simple measurement method with the insulation resistance meter 41, without employing the measurement method on the basis of the JIS, which can be also considered cumbersome and high-cost.

Next, in the pre-grasping step, the ceramic body 22 with the surface resistance value obtained in the way described above is subjected to electrolytic plating by variously changing the condition for the applying charge amount.

Figure 3:
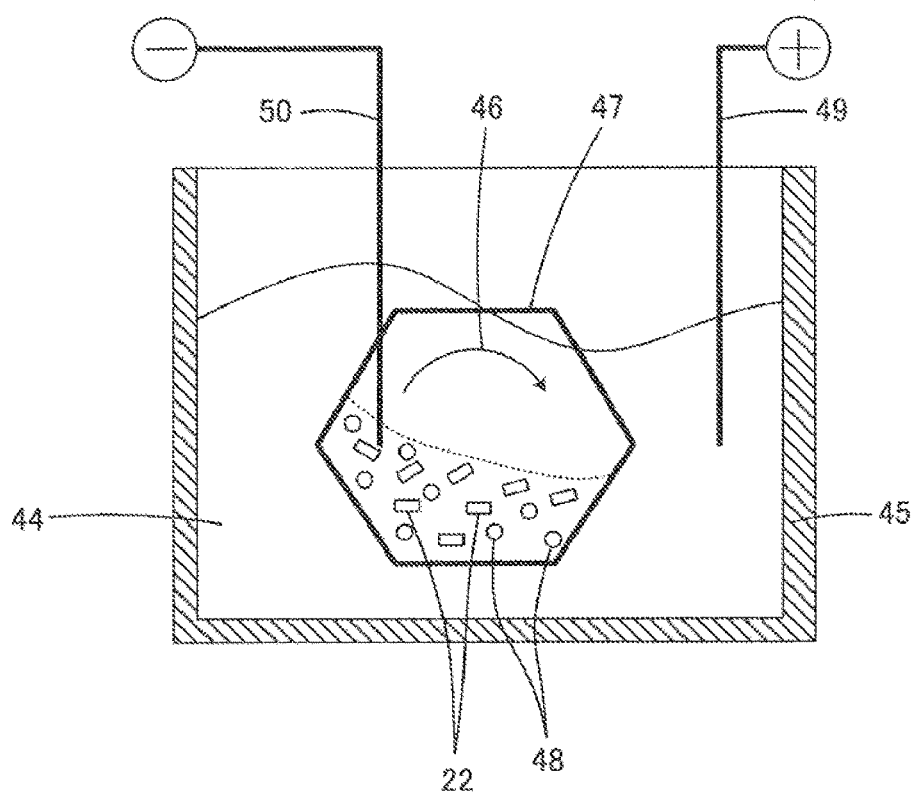
FIG. 3 is a front view graphically illustrating the ceramic body 22 included in the coil component 21 shown in FIG. 1, which is subjected to electrolytic plating by a barrel plating method.

FIG. 3 graphically illustrates ceramic bodies 22 subjected to electrolytic plating by a barrel plating method. A barrel 47 that rotates in the direction of an arrow 46 is disposed in a plating bath 45 containing an electrolytic solution 44. The barrel 47 is charged with a plurality of ceramic bodies to be subjected to electrolytic plating, along with a plurality of conductive media 48. In the electrolytic solution 44, an anode 49 is disposed, and a cathode 50 is disposed to be able to come into contact with the media 48 in the barrel 47.

In accordance with the barrel plating method, the rotation of the barrel 47 stirs the ceramic bodies 22 and media 48 therein, and this stir facilitates the contact of the media 48 with the end-surface base electrodes 35 and 36 and side-surface base electrodes 37 and 38 as seed electrodes. Then, with the media 48 in contact, current is applied to the end-surface base electrodes 35 and 36 and the side-surface base electrodes 37 and 38, and electrolytic plating proceeds with the seed electrodes as starting points.

Electrolytic plating is carried out by, for example, a barrel plating method as described above, thereby grasping the correlation among the surface resistance value, the applying charge amount, and the actual plating growth dimension L1 (see FIG. 1) obtained when plating is carried out with the applying charge amount. This correlation makes it possible to find out in advance that the applying charge amount for applying a current c (A) for d (minutes) is required when the plating growth dimension L1 of b (μm) is to be obtained at the surface resistance value a (Ω) of the ceramic body, for example, for a product A. It is to be noted that while the applying charge amount is expressed by the product of current value and plating time, only the current, only the time, or both may be changed in order to change the applying charge amount. In addition, for grasping the correlation mentioned above, the correlation may be grasped with the use of the plating growth dimensions Lia formed toward the centers of the side surfaces 23 and 25 with the side-surface base electrodes 37 and 38 as starting points, in place of the actual plating growth dimension L1.

After the foregoing pre-grasping step is completed, the coil component 21 is mass-produced on a full scale.

The pre-grasping step typically only has to be carried out once for one type of product.

It is to be noted that ceramic bodies that respectively represent different surface resistance values have to be prepared intentionally as the plurality of ceramic bodies 22 used for grasping the correlation among the surface resistance value, the applying charge amount, and the plating growth dimension in the pre-grasping step. The operation of varying the surface resistance value depending on whether the respective ceramic bodies 22 are subjected to surface polishing or not and the degree of the surface polishing as described previously is advantageous for the preparation of the ceramic bodies 22 that respectively represent different surface resistance values.

For the manufacture of the coil component 21 under a mass-production system, first, a resistance value measurement step is carried out for measuring the surface resistance value of the ceramic body 22 on which the plated films 33 and 34 are to be formed by next applying electrolytic plating. In this step, the surface resistance value of the ceramic body 22 is measured by bringing the pair of probes 42 and 43 as measurement terminals into contact with the same side surface from any of the four side surfaces 23 to 26 of the ceramic body 22 with the use of the insulation resistance meter 41 as shown in FIG. 2, as in the case of the pre-grasping step mentioned above.

In FIG. 2, the probes 42 and 43 are brought into contact with the side surface 23 of the ceramic body 22.

Preferably, this resistance value measurement step is carried out for a plurality of ceramic bodies, for example, twenty ceramic bodies 22, selected from among a plurality of ceramic bodies 22 from the same product lot, and the average value from twenty surface resistance values measured for each of the twenty ceramic bodies 22 is regarded as a surface resistance value obtained in accordance with the resistance value measurement step.

Next, an applying charge amount determination step is carried out. More specifically, the applying charge amount required for plating is determined by applying the surface resistance value obtained in accordance with the resistance value measurement step mentioned above and a designed value for an intended plating growth dimension to the above-described correlation among the surface resistance value, the applying charge amount, and the plating growth dimension L1 (or L1a).

It is to be noted that the designed value for the intended plating growth dimension is typically determined before the applying charge amount determination step, because the applying charge amount determined in the applying charge amount determination step described above is determined on the basis of the intended plating growth dimension.

Thereafter, in order to form the plated films 33 and 34, a plating step is carried out, where the ceramic bodies 22 are subjected to electrolytic plating with the applying charge amount determined. In this plating step, the plurality of ceramic bodies 22 from the same product lot are subjected to electrolytic plating with the same applying charge amount determined on the basis of the average value from surface resistance values measured for the plurality of ceramic bodies as described previously, the twenty ceramic bodies 22 herein. Therefore, the barrel plating method shown in FIG. 3 is also advantageously applied in this plating step.

Next, in the case of switching the product lot and starting an electrolytic plating step for ceramic bodies 22 from a product lot that is different from the previous one, again, the resistance value measurement step is carried out, and the surface resistance value obtained in this step and a designed value for the plating growth dimension L1 are applied to the previously described correlation to determine the applying charge amount required for plating. Then, with this applying charge amount, the ceramic bodies 22 are subjected to electrolytic plating by the barrel plating method shown in FIG. 3.

As just described, according to this embodiment, the correlation is grasped in advance among the surface resistance value of the ceramic body 22, the applying charge amount, and the plating growth dimension L1, on that basis, the surface resistance value is measured for the ceramic body 22 on which the plated films 33 and 34 are to be formed, and electrolytic plating is carried out with the applying charge amount obtained by applying, to the correlation mentioned above, the surface resistance value and the designed value for the intended plating growth dimension L1. Thus, in particular, among different lots, the variation in plating growth dimension L1 can be suppressed.

The coil component 21 as an example has been described above as a ceramic electronic component to which this disclosure is directed. In the case of the coil component 21, the ceramic body 22 is composed of a ferrite material, and the ferrite material is lower in surface resistance value than the dielectric material constituting a ceramic body in the case of a multilayer ceramic capacitor, for example. Therefore, the variation in plating growth dimension can be presumed to be larger on the ferrite material than on the dielectric material. In this regard, this disclosure can be considered more significant, when the disclosure is applied to a coil component than to a multilayer ceramic capacitor.

However, this disclosure can be applied to not only the coil component, but also other ceramic electronic components such as multilayer ceramic capacitors and thermistors. In addition, this disclosure can be applied to not only ceramic electronic components where the number of external electrodes is two, but also ceramic electronic components including three or more external electrodes.

In order to obtain external electrodes of ceramic electronic components, the plating step may be carried out more than once. The plating step may be carried out more than once, such as Ni plating and Sn plating thereon, or Cu plating, Ni plating thereon, and Sn plating further thereon, for example. In this case, for each of the plurality of plating steps, the applying charge amount determination step described previously is carried out to determine the applying charge amount. Further, the correlation grasped in the pre-grasping step and the surface resistance value measured in the resistance value measurement step are used for determining the applying charge amount for each of the plurality of plating steps.

Figure 4:
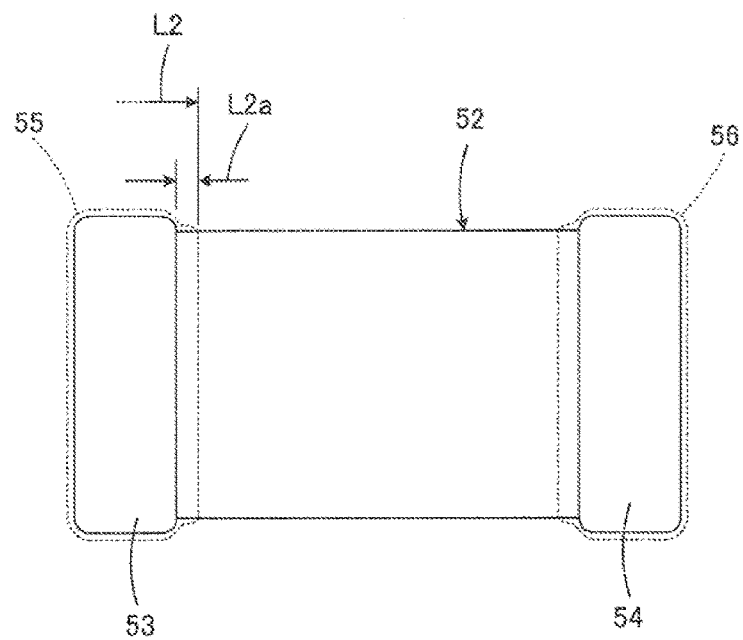
FIG. 4 is a front view of a ceramic body 52 for explaining a plating step carried out more than once in a manufacturing method according to a second embodiment of this disclosure.
Figure 5:
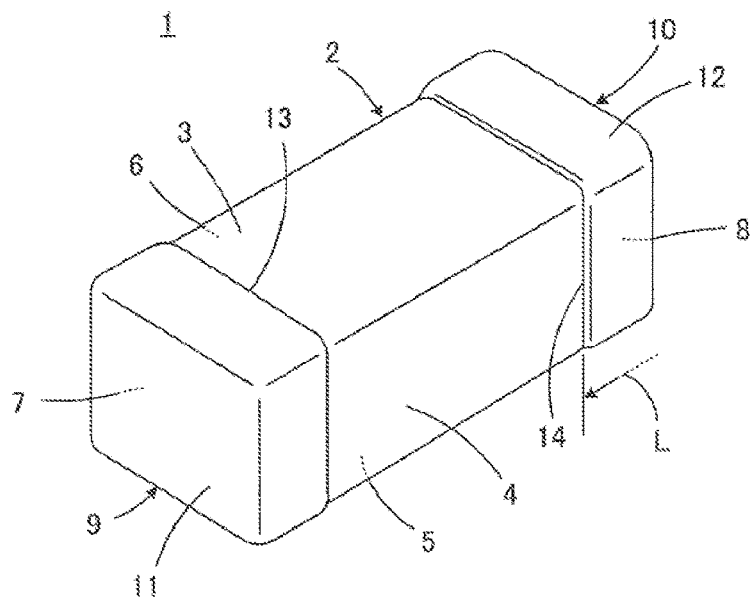
FIG. 5 is a perspective view illustrating the appearance of a ceramic electronic component 1 of interest to this disclosure.

A more specific explanation will be provided with reference to FIG. 4. In FIG. 4, a ceramic body 52 is shown after a first plating step is completed. First plated films 53 and 54 formed in the first plating step are formed on both ends of the ceramic body 52. For the formation of the first plated films 53 and 54, a measure as a feature of this disclosure is taken to reduce the variation in plating growth dimension as described previously.

Next, with the first plated films 53 and 54 as seed electrodes, a second plating step is carried out to form second plated films 55 and 56 respectively on the first plated films 53 and 54, and on some regions of the ceramic body 52, as indicated by dotted lines in FIG. 4. Also in this case, a measure as a feature of this disclosure is taken to reduce the variation in plating growth dimension L2 (or L2a). More specifically, the correlation grasped in the pre-grasping step and the surface resistance value measured in the resistance value measurement step are used for determining the applying charge amount in this second plating step.

Also in the case of carrying out third and subsequent plating steps, similar measures are taken.

It is to be noted that the elements denoted by the reference numerals "53" and "54" in FIG. 4 are referred to as "plated films" in the foregoing description, but may refer to conductor films formed by baking a conductive paste. In this case, the plated films 55 and 56 indicated by the dotted lines are formed by electrolytic plating, with the conductor films 53 and 54 as seed electrodes, and in this stage of forming the plated films 55 and 56, a measure as a feature of this disclosure will be taken to reduce the variation in plating growth dimension L2.

The invention claimed is:

1. A method for manufacturing a ceramic electronic component comprising a ceramic body and an external electrode formed on the ceramic body, wherein the external electrode is provided at least partially by a plated film formed by applying electrolytic plating, the method comprising:
a pre-grasping step of grasping in advance a correlation, for a ceramic electronic component to be manufactured, among a surface resistance value of a ceramic body, an applying charge amount for electrolytic plating, and an actual plating growth dimension obtained when the ceramic body with the surface resistance value is subjected to plating with the applying charge amount;
a resistance value measurement step of measuring a surface resistance value of a ceramic body on which a plated film to serve as at least a part of an external electrode is to be formed by applying electrolytic plating;
an applying charge amount determination step of determining an applying charge amount required for plating by applying the surface resistance value obtained in accordance with the resistance value measurement step and a designed value for an intended plating growth dimension to the correlation; and
a plating step of applying electrolytic plating to the ceramic body with the applying charge amount obtained in accordance with the applying charge amount determination step, in order to form the plated film.

2. The method for manufacturing the ceramic electronic component according to claim 1,
wherein the resistance value measurement step is carried out for a specific number of ceramic bodies selected from among a plurality of ceramic bodies in a same product lot, and an average value obtained from a specific number of surface resistance values measured respectively for the specific number of ceramic bodies is regarded as the surface resistance value obtained in accordance with the resistance value measurement step, and
in the plating step, electrolytic plating is applied to the plurality of ceramic bodies within the same product lot, with the same applying charge amount determined on the basis of the average value obtained from the specific number of surface resistance values.

3. The method for manufacturing the ceramic electronic component according to claim 1,
wherein the ceramic body has a seed electrode formed as a starting point for plating growth, and
the plating step is carried out so as to achieve plating growth with the seed electrode as a starting point.

4. The method for manufacturing the ceramic electronic component according to claim 1,
wherein the plating step is carried out more than once, and an applying charge amount is determined in accordance with the applying charge amount determination step for each of the plurality of plating steps, and
the correlation grasped in the pre-grasping step and the surface resistance value measured in the resistance value measurement step are used for determining the applying charge amount for each of the plurality of plating steps.

5. The method for manufacturing the ceramic electronic component according to claim 1, further comprising a target value determination step of determining a designed value for the intended plating growth dimension before the applying charge amount determination step.

6. A method for manufacturing a ceramic electronic component comprising a ceramic body and an external electrode formed on the ceramic body, wherein the external electrode is provided at least partially by a plated film formed by applying electrolytic plating, the method comprising:
a pre-grasping step of preparing a plurality of ceramic bodies that respectively represent different surface resistance values, and using the plurality of ceramic bodies to grasp in advance a correlation, for a ceramic electronic component to be manufactured, among a surface resistance value of a ceramic body, an applying charge amount for electrolytic plating, and an actual plating growth dimension obtained when the ceramic body with the surface resistance value is subjected to plating with the applying charge amount;
a resistance value measurement step of measuring a surface resistance value of a ceramic body on which a plated film to serve as at least a part of an external electrode is to be formed by applying electrolytic plating, other than the plurality of ceramic bodies used in the pre-grasping step;
a target value determination step of determining a designed value for an intended plating growth dimension;
an applying charge amount determination step of determining an applying charge amount required for plating by applying the surface resistance value obtained in accordance with the resistance value measurement step, and the designed value for the plating growth dimension determined in the target value determination step, to the correlation; and
a plating step of applying electrolytic plating to the ceramic body with the applying charge amount obtained in accordance with the applying charge amount determination step, in order to form the plated film.

7. The method for manufacturing the ceramic electronic component according to claim 6, wherein the plurality of ceramic bodies used in the pre-grasping step and the ceramic body with the surface resistance value measured in the resistance value measurement step are included together in a same product lot.

* * * * *